Patented Mar. 12, 1935

1,994,071

UNITED STATES PATENT OFFICE 1,994,071

PROCESS FOR OBTAINING IMPROVED SHELLAC COMPOSITIONS FOR MOLDING

William Howlett Gardner, New York, N. Y.

No Drawing. Application October 22, 1932,
Serial No. 639,042

2 Claims. (Cl. 106—22)

The principal object of this invention relates to a process whereby an improved composition is obtained for plastic molding purposes which gives articles having greater resistance to warping and deformation at high temperatures, and yet retains the mechanical and physical properties of the present products.

Shellac was one of the first substances used as a base in plastic composition. Because of its wide use in this and the spirit varnish fields, it has become customary to classify as shellac substitutes many resins which in their physical and chemical properties have little or no resemblance to shellac. The aldehyde-phenol resins when soluble in alcohol, have frequently been so classed. These resins lack many of the mechanical and physical properties inherent in shellac and since there is a very marked difference in rate and manner of polymerization or cure, the mechanical processes employed in manufacturing articles from the two types differ. Because of the relatively low softening or fusion temperatures of the usual shellac compositions, aldehyde-phenol resins have supplanted shellac for certain specific uses in spite of the fact that they may be inferior in other properties.

For certain engineering uses the softening or deformation temperature of a molded article is very important. In order to meet specifications in such cases it was necessary to subject the shellac article to a prolonged heat treatment. This for most cases has hitherto proven to be impractical. Prolonged application of heat with the subsequent cooling in the mold so slows up production that the cost is prohibitive. Baking finished articles will cause warping and distortion, and in many cases the structure is weakened through the formation of blisters from water which is evolved during the baking process.

In the manufacture of shellac molded articles, one method consists in mixing a suitable amount of shellac and filler and passing this between hot rolls maintained at a temperature sufficient to keep the shellac in a molten state. The mixture is repeatedly repassed between the rolls until the filler has become thoroughly wetted with the molten shellac and has a uniform composition. The resulting plastic mass is then pressed into slabs or biscuits, and may be allowed to cool and stored until desired for molding. If colored objects are required, the coloring material is added in the original mixture.

Before molding the slabs or biscuits are rendered plastic by heating them on a steam table. Pieces of sufficient size to fill the mold are then cut with a knife, and the articles molded under pressure in a case-hardened steel die. The hydraulic press is water cooled during this operation. When sufficiently cool to be handled without distortion, the pressure is released and the finished article removed.

For large pieces the shellac and filler in a plastic condition are forced by pressure into the mold. This is known as extrusion.

In either case it can be readily seen that little opportunity is afforded for polymerization and condensation of the shellac to take place or to obtain articles highly resistant to heat deformation. However, I have found that it is both economical and practical to subject the slabs or biscuits to a baking process prior to molding in order to accomplish this result. Beneficial condensing agents such as dicyandiamide, phthalic anhydride, sulfanilic acid, such as described in my co-pending applications as containing two or more active chemical groups may be incorporated in the composition with improved results. The material resulting from the baking process may then be molded while still plastic, or it may be cooled and stored for use. If desired, the slabs may be broken up and the composition ground and molded in powdered form by the use of a hot mold and subsequent cooling of the article in the die. To my knowledge, this is the first time a successful baking process has been employed with shellac compositions prior to molding of the articles.

Since shellac compositions vary widely in character from all aldehyde-phenol resin compositions, it is not necessary to add any plastic solvent or condensing agents in order to be able to mold the composition resulting from the heat treatment process such as is required when using aldehyde resins (U. S. Patent 1,146,388) but because of the totally different thermo-plastic characteristics of shellac a wide variety of chemicals, such as those described in my co-pending applications, ranging from strong acids to strong bases can be added to obtain the marked beneficial results.

Unlike aldehyde-phenol resins, shellac remains plastic for a relatively long period of time during polymerization and condensation, so that by proper control of the baking process it is not necessary to employ blank forms for this process, since the trimmings can beneficially be added to the original mixture of ingredients employed in preparing the composition prior to baking.

As examples of my invention, I cite the following:—

*Example 1.*—A mixture of nine pounds of asbestos and three pounds of shellac is thoroughly mixed, as by passing between hot rolls maintained at a temperature sufficient to keep the shellac molten, until the composition is uniform. The plastic mass is then pressed into sheets or slabs and these are subjected to heat at 300° F. for a period of ½ hour. The slabs or sheets are then formed into units adapted for reception by molds, or, they may be cooled and comminuted, as, for example, ground to powdered form. The comminuted mixture may readily be placed in molds and pressed into forms in the usual manner.

*Example 2.*—A mixture of nine pounds of asbestos, three pounds of shellac and one ounce of dicyandiamide is repeatedly passed between hot rolls maintained at a temperature sufficient to keep the shellac molten, until the composition has a uniform distribution. The plastic mass is then pressed into slabs and these are placed in an indirect heating oven at 293° F. The oven is maintained at this temperature and the composition subjected to a bake of one-half hour. The slabs are then cut into shape and size suitable for filling the mold. The article is formed in the mold by subjecting this material to 2700 pounds per square inch pressure in a water cooled hydraulic press. Conditions may be varied widely. In this application, shellac refers to all forms of lac, products prepared from the secretion of the lac insect.

Having described my invention, what I claim, and desire to secure by Letters Patent, is as follows:—

1. The process of forming a shellac composition adapted for use in plastic molding, which consists in preparing an intimate mixture of shellac and a filler, then subjecting the said mixture to a baking process conducted at atmospheric pressure securing the major part of condensation of the shellac.

2. The process of forming a shellac composition adapted for use in plastic molding, which consists in preparing an intimate mixture of shellac and a filler, then subjecting the said mixture to a baking process conducted at atmospheric pressure securing the major part of condensation of the shellac, and thence forming the treated composition into units adapted for reception by molds.

WILLIAM HOWLETT GARDNER.